United States Patent [19]

Suydam

[11] 4,029,137

[45] June 14, 1977

[54] PNEUMATIC TIRE
[75] Inventor: Robert D. Suydam, Cuyahoga Falls, Ohio
[73] Assignee: The Goodyear Tire & Rubber Company, Akron, Ohio
[22] Filed: Dec. 15, 1975
[21] Appl. No.: 640,596
[52] U.S. Cl. ............................ 152/362 R; 152/354
[51] Int. Cl.² ................. B60C 15/04; B60C 15/06; B60C 9/02
[58] Field of Search ... 152/362 R, 362 CS, 354–356

[56] References Cited
UNITED STATES PATENTS

| 1,349,902 | 8/1920 | Midgley | 152/362 R |
| 1,451,645 | 4/1923 | Archer | 152/362 R |
| 1,548,370 | 8/1925 | Midgley | 152/362 R |
| 3,111,976 | 11/1963 | DeLobelle | 152/362 R |
| 3,826,297 | 7/1974 | Alderfer | 152/362 R |

FOREIGN PATENTS OR APPLICATIONS

| 1,127,521 | 8/1956 | France | 152/362 R |

*Primary Examiner*—Drayton E. Hoffman
*Attorney, Agent, or Firm*—F. W. Brunner; H. E. Hummer

[57] ABSTRACT

An aircraft tire having a plurality of bias carcass plies and a pair of bead portions, each including three inextensible bead cores. All of the carcass plies in each bead portion are wrapped about the two axially innermost bead cores while the axially outermost bead core is free of any radial stresses imparted by carcass plies.

6 Claims, 1 Drawing Figure

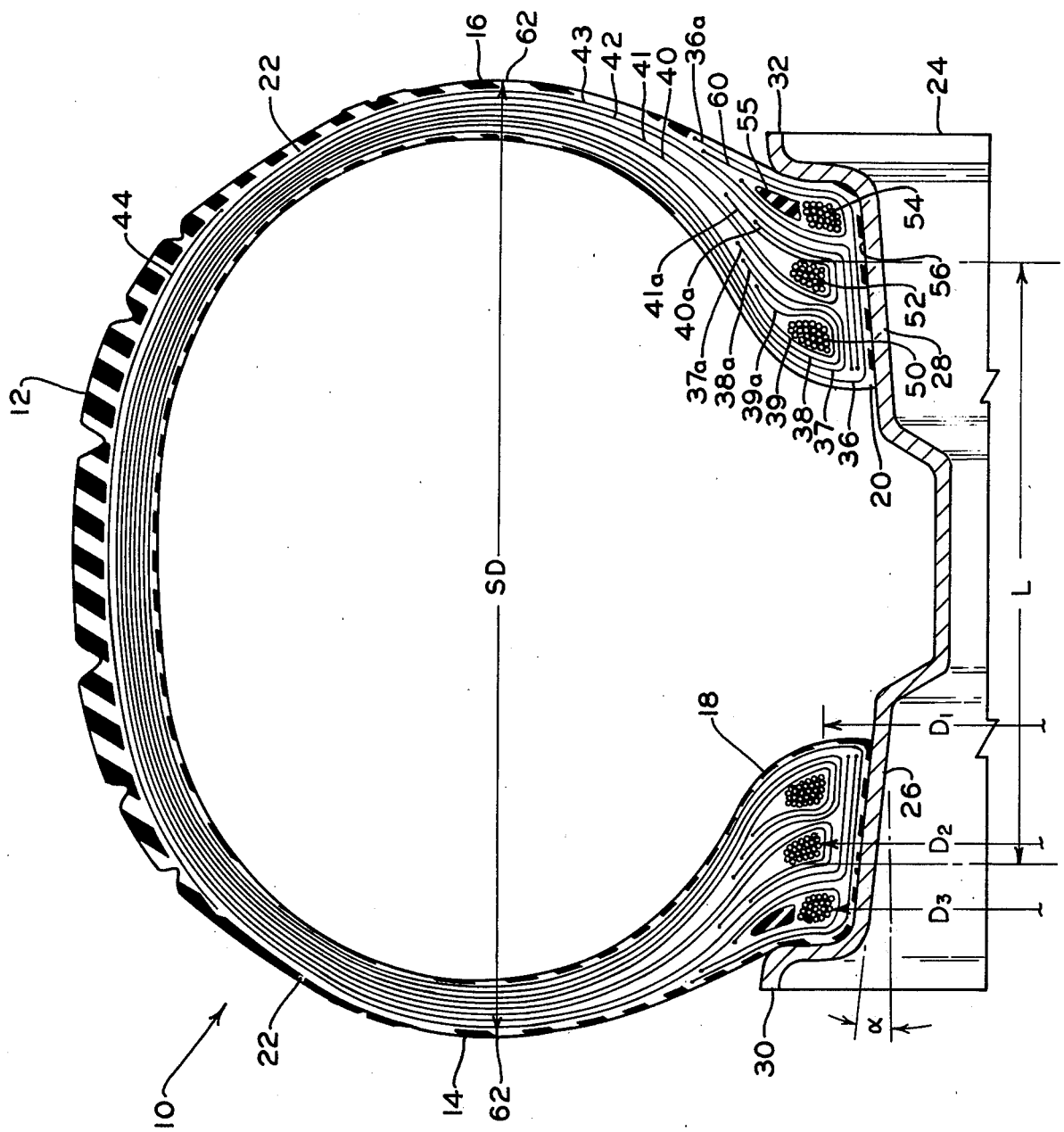

PNEUMATIC TIRE

The foregoing abstract is not to be taken as limiting the invention of this application, and in order to understand the full nature and extent of the technical disclosure of this application, reference must be made to the accompanying drawing and the following detailed description.

This invention relates to pneumatic tires and more particularly to a novel bead structure specifically for use in aircraft tires.

An aircraft tire is subjected to extreme operating conditions which may include inflation pressures in excess of 200 pounds per square inch (14 kilograms force per square centimeter) and landing speeds in excess of 200 miles per hour (322 kilometers per hour). They must be capable of absorbing extreme forces on landing, may be subjected to more than 30 percent deflection while taxiing, 40 percent deflection on take-off and 45 percent deflection or more under impact conditions. Such extreme pressures, loads and deflections put the lower sidewall area adjacent the beads to severe tests. The high inflation pressures cause large tensile forces in this bead area while the high deflection rates cause high compressive forces in the axially outer portion of the bead area. These extreme operating conditions can tend to decrease the durable life of the lower sidewall and bead areas.

It is an object, therefore, of the present invention to provide improved durability in the lower sidewall and bead area of an aircraft tire of the type having a multiplicity of carcass plies and at least three bead cores in each bead area.

The invention accordingly consists in the features of construction, combination of elements and arrangement of parts which will be exemplified in the construction hereinafter set forth and the scope of the application of which will be indicated in the appended claims.

In the drawing, the single FIGURE is a cross sectional view of a tire made in accordance with the present invention, mounted on a rim and inflated.

With reference to the drawing, there is illustrated a tire 10 which in the specific embodiment illustrated, is a size 40 × 14 aircraft tire. The tire, therefore, has a 40 inch (101.6 centimeters) inflated outside diameter and the maximum width of the inflated tire in axial directions is 14 inches (35.6 centimeters).

The tire 10 includes a ground engaging circumferentially extending tread portion 12, a pair of sidewalls 14, 16 extending radially inwardly from the axially outer edges of the tread portion and terminating at their radially inner extremities in a pair of bead portions 18, 20. A cord reinforced carcass structure 22 extends circumferentially about the tire and from bead portion 18 to bead portion 20. As illustrated, the tire 10 is mounted on a rim 24 and is inflated to normal inflation pressure which in this case is approximately 170 pounds per square inch (1.17 × 10⁶ Newton's per square meter). The rim 24 includes a pair of tapered annular bead seats 26, 28 for receiving the bead portions 18, 20 of the tire 10. A pair of flanges 30, 32 extend radially outwardly from the axially outer edges of respective bead seats 26, 28. Bead seats 26, 28 are tapered at an angle alpha of 5° with respect to the rotational axis of the tire.

The particular embodiment of the cord reinforcing structure 22 includes eight pairs of plies of tire cord fabric 36, 37, 38, 39, 40, 41, 42 and 43. Each pair of plies has one of its plies extending at one bias angle with respect to the circumferential center line of the tire and the other ply at the same angle but extending at an opposite direction with respect to the circumferential center line. The circumferential centerline is a line extending about the tire and forming a circle disposed midway between the axially outer edges of the tread 12 with the rotational axis of the tire as its center. The angle that the cords in the individual carcass plies makes with respect to the circumferential centerline decreases progressively from an angle of about 42° in the radially inner pair of plies 36 to 30° in the radially outer pair of plies 43.

Also included in the carcass structure 22 is a pair of breaker plies 44 extending circumferentially about the carcass and generally from one edge of the tread portion 12 to the axially opposite edge of the tread portion 12. The angle of the cords in the tread plies with respect to the circumferential centerline is approximately 22°. The material of the cords in all of the plies in the carcass structures 22 is nylon although any suitable material or combination of materials can be utilized. Further, while specific angles have been specified for the carcass and belt plies, these angles can be varied within the normal range of bias ply aircraft tires. For example, the angles of the carcass plies could be from 25° to 45° while the angle of the breaker plies can be from about 20° to 45°.

In accordance with the present invention, a novel arrangement of the various components in the bead portions and a novel arrangement of the tie-in of the carcass plies to the bead cores are provided. For purposes of simplicity only one bead portion 20 will be described, it being understood that the bead portion 18 is similar.

The bead portion 20 includes three annular inextensible bead cores 50, 52 and 54. The bead cores 50 and 52 are of diameters such that they are spaced substantially the same distance from the annular bead seat 28 while the bead core 54 is of significantly smaller diameter and is located closer to the radially inwardly facing bead seat surface 56 of the bead portion 20. Further, the inside diameters $D_1$ and $D_2$ of the axially innermost bead cores 50 and 52 are greater than the diameter $D_3$ of the axially outermost bead core 54.

Three pairs of carcass plies 37, 38 and 39 extend radially inwardly of the tire adjacent the axially inner side of the axially inner bead core 50. The respective end portion 37a, 38a and 39a are turned axially outwardly about the bead core 50 and radially outwardly adjacent the bead core 50 to thereby firmly anchor the carcass plies 37, 38 and 39 to the axially innermost bead core 50. For purposes of this invention an "end portion" shall be that portion of a carcass ply that extends radially outwardly from a bead core. If this end portion terminates short of the point 62 of maximum axial width of the tire, it is not considered a working portion of the ply since it does not exert a significant radially outwardly directed pull on the bead core. A bead core that absorbs a major radially outwardly directed pull of a carcass ply is an active or working bead core and for purposes of this invention is considered to be a bead core that has any axial side and a radially inner side bounded successively by the working portion of a carcass ply as it extends radially inwardly from the tread portion and axially about the bead. Conversely, if the major radially outwardly directed tensile forces of a ply are absorbed by a bead core in this manner the ply will be considered anchored to that bead core. The bead core 50 is therefore an active or working bead core since it resists the radially outwardly directed tensile loading of the pairs of carcass plies 37, 38 and 39 caused by inflation pressure and loads on the tire.

The pairs of carcass plies 40 and 41 similarly extend radially inwardly adjacent the axially inner side of the central or middle bead core 52 and have their end portions 40a and 41a turned radially outwardly of the bead core 52. The bead core 52 therefore is also an active or working bead core since it has the pairs of plies 40 and 41 securely anchored thereto and supports the tensile stresses of these plies.

The outer two pairs of carcass plies 42 and 43 extend radially inwardly about the axially outer side of the middle bead core 52 and are turned axially inwardly adjacent the radially inner sides of the inextensible bead cores 50 and 52. Since the pairs of carcass plies 42 and 43 are successively wrapped about two sides of the inextensible bead core 52 as they progress radially inwardly from the tread 12, the tensile loading of these plies caused by inflation pressure and loadings on the tire are supported by the inextensible bead core 52.

The axially outermost bead core 54 has no carcass plies extending radially inwardly adjacent thereto and wrapped thereabout and thus does not support or absorb any major radially outwardly directed tensile forces. The inextensible bead core 54, therefore, is a nonworking or inactive bead core. A pair of flipper plies 60 of any suitable tire cord fabric are wrapped about the bead core 54 and enclose an annular triangular shaped rubber apex 55 adjacent the bead core 54. The flipper plies 60 extend radially outwardly beyond the radially outer extremity of the rim flanges 32 but terminate short of the point 62 of maximum axial width of the inflated tire.

The innermost pair of carcass plies 36 extend radially inwardly adjacent the axially inner side of the axially innermost bead core 50 and axially outwardly ajacent the radially inner sides of all three bead cores 50, 52 and 54. The end 36a of the pair of plies 36 extends radially outwardly adjacent the axially outer side of the bead core 54. The end portion 36a terminates in the lower sidewall area at a point radially outwardly of the rim flange 32 but short of the point 62 of maximum section width of the inflated tire. The pair of plies 36, being wrapped successively about two sides of the bead core 50 as it extends radially inwardly from the tread portion 12, has its radially outwardly directed tensile forces supported by the working bead core 50.

The axial distance L between the axially outermost points on the axially outermost working bead cores is 68 percent of the maximum axial width SD of the inflated tire 10. Preferably this axial distance is from 60 percent to 70 percent of the maximum section width SD of the tire 10.

As noted, an active or working bead core is a bead core which supports or resists the radially outwardly directed tensile forces exerted on the bead area by the carcass plies. It can be seen, for example, and as noted above, that the radially outwardly tensile forces of the pairs of plies 36 through 39 are supported by the bead core 50 while the radially directed forces of the pairs of plies 40 through 43 are supported by the inextensible bead core 52. The end portion 36a of the carcass ply 36, while it extends adjacent the bead core 54, terminates short of the point 62 of maximum section width of a tire and therefore provides little or no radially outwardly directed forces on the bead core 54. The bead core 54, therefore, has no carcass plies anchored thereabout and thus would be considered a nonworking or inactive bead core.

An aircraft tire built in accordance with the present invention was tested against standard production aircraft tires for durability. The standard tire was size 40 × 14 and was made of the same materials and of similar construction except: the axially outer bead core 54 was of a larger diameter than the other two bead cores 50 and 52; the pair of plies 39 was wrapped about the middle bead core 52; the pair of plies 41 was wrapped about the axially outer bead core 54; and, the two pairs of plies 42 and 43 extended adjacent the axially outer side of the axially outer bead core 54 and across the radially inner sides of all bead cores. The tire, according to the present invention exhibited a 50 percent improvement over the average durability of the standard tires and a 15 percent improvement over the highest durability found in the standard tires. Thus, it can be seen that the present invention provides a surprising and marked improvement in the durability of the lower sidewall and bead area of an aircraft tire.

It will be appreciated that more than three inextensible bead cores could be provided in each bead portion. It is important in this respect, however, that the axially outer bead core be free of any significant axially, outwardly directed tensile forces exerted by carcass plies and that all of the carcass plies be anchored about bead cores disposed axially inwardly of the axially outer bead core.

While certain representative embodiments and details have been shown for the purpose of illustrating the invention, it will be apparent to those skilled in this art that various changes and modifications may be made therein without departing from the spirit or scope of the invention.

What is claimed is:

1. In an aircraft tire comprising a tread portion, a pair of sidewall portions, a pair of spaced-apart bead portions each having an axially outwardly facing flange engaging surface, a plurality of carcass plies extending circumferentially about the tire from bead portion to bead portion, and at least three inextensible bead cores disposed side-by-side in each bead portion and spaced-apart axially, the improvement comprising: at least one carcass ply wrapped around, and anchoring to said tire, each of the bead cores other than the axially outermost bead cores closest said flange engaging surfaces, the radially innermost carcass ply being wrapped around the bead cores of each bead portion and the carcass plies anchoring the bead cores other than the axially outermost bead cores, said innermost carcass ply extending from the axially outermost bead cores radially outwardly beyond the flange engaging surfaces and terminating short of the point of maximum axial width of said tire to hold the bead cores of each bead portion together and the axially outermost bead cores to said tire.

2. A tire as claimed in claim 1 wherein the diameter of the radially innermost surface of the axially outermost bead core in each bead portion is less than the diameter of the radially innermost surface of any of the other bead cores in said each bead portion.

3. A tire as claimed in claim 1 wherein each axially outermost bead core has a layer of cord reinforced material wrapped thereabout with the ends thereof extending radially outwardly beyond the flange engaging surface of the respective bead portion but terminating short of the point of maximum axial width of said tire.

4. A tire as claimed in claim 1 further having a radially inwardly facing bead seat surface and characterized by the axially outermost bead core being disposed closer to said bead seat surface than any other bead core in the respective bead portion.

5. A tire as claimed in claim 1, wherein the overall distance between the axially outermost surfaces of the axially outermost bead cores does not exceed 70 percent of the maximum axial width of said tire, when inflated.

6. A tire as claimed in claim 1, in combination with a wheel rim with outstanding annular flanges against which the bead portions seat.

* * * * *

UNITED STATES PATENT OFFICE
CERTIFICATE OF CORRECTION

PATENT NO. : 4,029,137
DATED : June 14, 1977
INVENTOR(S) : Robert D. Suydam

It is certified that error appears in the above-identified patent and that said Letters Patent are hereby corrected as shown below:

Column 2, line 33, change "head" to --bead--.

Column 3, line 34, change "flanges" to --flange--.

Signed and Sealed this

Fourth Day of July 1978

[SEAL]

Attest:

RUTH C. MASON
Attesting Officer

DONALD W. BANNER
Commissioner of Patents and Trademarks